May 28, 1957

C. F. SMITH 2,793,890

KNOT TYING MECHANISM

Filed Aug. 19, 1953

INVENTOR.
Carlisle F. Smith
BY
Soans, Elaister & Anderson
Attys.

May 28, 1957  C. F. SMITH  2,793,890
KNOT TYING MECHANISM
Filed Aug. 19, 1953  9 Sheets-Sheet 2

Fig. 2.

INVENTOR.
Carlisle F. Smith
BY
Soans, Olaister & Anderson
Attys.

May 28, 1957   C. F. SMITH   2,793,890
KNOT TYING MECHANISM
Filed Aug. 19, 1953   9 Sheets-Sheet 7

INVENTOR.
Carlisle F. Smith
BY
Soans, Dleister & Anderson
Attys.

May 28, 1957 C. F. SMITH 2,793,890
KNOT TYING MECHANISM
Filed Aug. 19, 1953 9 Sheets-Sheet 8

INVENTOR.
Carlisle F. Smith
BY
Soans, Gleister & Anderson
Attys.

United States Patent Office 2,793,890
Patented May 28, 1957

2,793,890

KNOT TYING MECHANISM

Carlisle F. Smith, Knoxville, Ill., assignor to J. I. Case Company, Racine, Wis., a corporation of Wisconsin Application August 19, 1953, Serial No. 375,125

7 Claims. (Cl. 289—9)

The present invention relates generally to balers, and is more particularly directed to an improved form of knot tying mechanism for use with balers using a flexible strand, such as twine, for holding the bales together.

In the baling of materials, principally hay and other agricultural crops, twine has been used quite extensively as the means for securing the bales together. However, there has long existed the problem of providing a knot tying mechanism which will operate with a maximum efficiency in tying a satisfactory knot in the twine, that is, consistently tie a knot which is sufficiently strong to hold the compressed bale together during the ordinary handling operations. The knot tying mechanism used heretofore have not been sufficiently reliable for automatic bale production in that they do not always tie a proper knot and often break the twine in attempting to tie the knot.

The principal object of the present invention is to provide an improved knot tying mechanism for use with a flexible strand in tying compressed bales of material. Another object of the invention is to provide an improved twine tying mechanism for use with balers, which provides a novel and improved form of bill-hook for tying the knot. Other objects and advantages will be apparent as the disclosure progresses with respect to the embodiment illustrated in the accompanying drawings, wherein:

Figure 1:
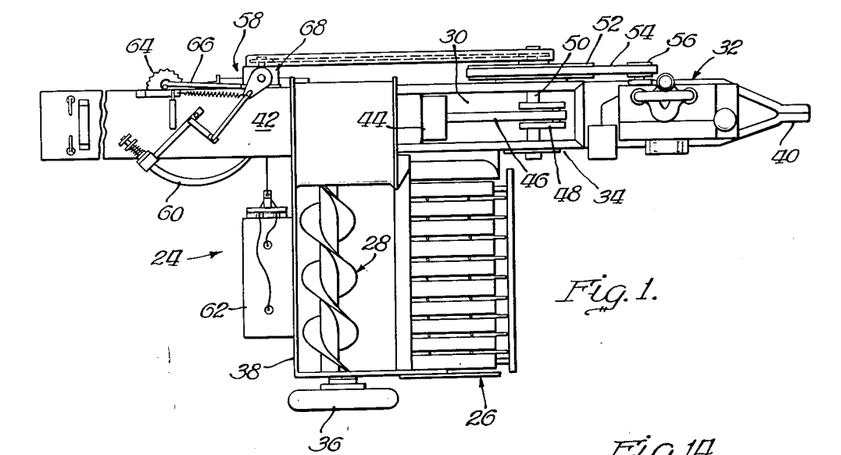
Fig. 1 is a plan view of a pick-up baler utilizing the present invention.

Referring to the drawings, Fig. 1 illustrates a pick-up baler 24 to which the novel tying mechanism of the present invention is applied. This baler comprises a pick-up unit 26, an auger-type feed means 28, a baling unit 30, and a source of power comprising an engine 32. The engine 32 and the baling unit 30 are supported on an elongated frame structure 34, suitably carried by a pair of wheels 36, and the pick-up unit and feed means are supported on a laterally extending frame section 38. The forward end of the elongated frame 34 includes a suitable hitch means 40 for connection with the drawbar of a tractor or other powered vehicle.

The pick-up unit 26, which is normally driven by one of the supporting ground wheels 36, collects the material to be baled from the ground and carries it to the feed means 28 which conveys the material to the baling chamber 42 of the baler. A baling plunger 44 reciprocates within the baling chamber to compress the material into baled form, and the plunger is driven by a pitman 46 secured to a crank pin 48 on a shaft 50 which is driven, through the wheel 52 and belt 54, from the flywheel 56 of the engine 32.

The baler also includes the tying mechanism 58 which coacts with a pair of needles 60, only one of which is shown, to wrap a pair of strands of twine or the like, from a twine-ball holder 62 disposed at the rear of the pick-up unit, around the bale as it is formed and to tie the twine so as to hold the compressed bale together. A toothed wheel 64 disposed along one side of the baling chamber is engaged by the material being baled and is rotated slowly by the bale as the latter is moved along the chamber. A link 66 connects the toothed wheel 64 with a clutch 68 operating the tying mechanism and needle, so that the latter devices operate in timed relation to the formation of the bale.

With reference to Figs. 2–7, it is seen that the tying mechanism 58, with which the present invention is particularly concerned, comprises a frame 70 suitably mounted on the side of the baling chamber 42 and supporting a vertical operating shaft 72 for the mechanism. The drive for the shaft 72 is provided by a chain and sprocket connection 74 (Figs. 2 and 3) between the wheel 52 and a stub shaft 76 extending from a gear box 78. The inner end of the shaft 76 carries a bevel gear 80 in meshing engagement with another bevel gear 82 mounted on the upper end of the shaft 72 for driving engagement therewith through operation of the clutch mechanism 68.

Secured to the shaft 72 for rotation therewith are a pair of cam wheels 84 and 86 which control the operation of various portions of the tying mechanism, the upper cam 84 controlling the tying of the upper strand of twine and the lower cam 86 controlling the tying of the lower strand of twine. Below each of the cam wheels 84 and 86 are disposed a pair of knotter frames 88 and 90, each of which includes a hollow cylindrical supporting arm 92 disposed on the shaft 72 for rotation relative thereto. Since the knotter frames and the tying mechanism supported thereby are identical for tying the upper and lower strands of twine, only one of the units, i. e., the lower unit 90, will be described.

Figure 2:
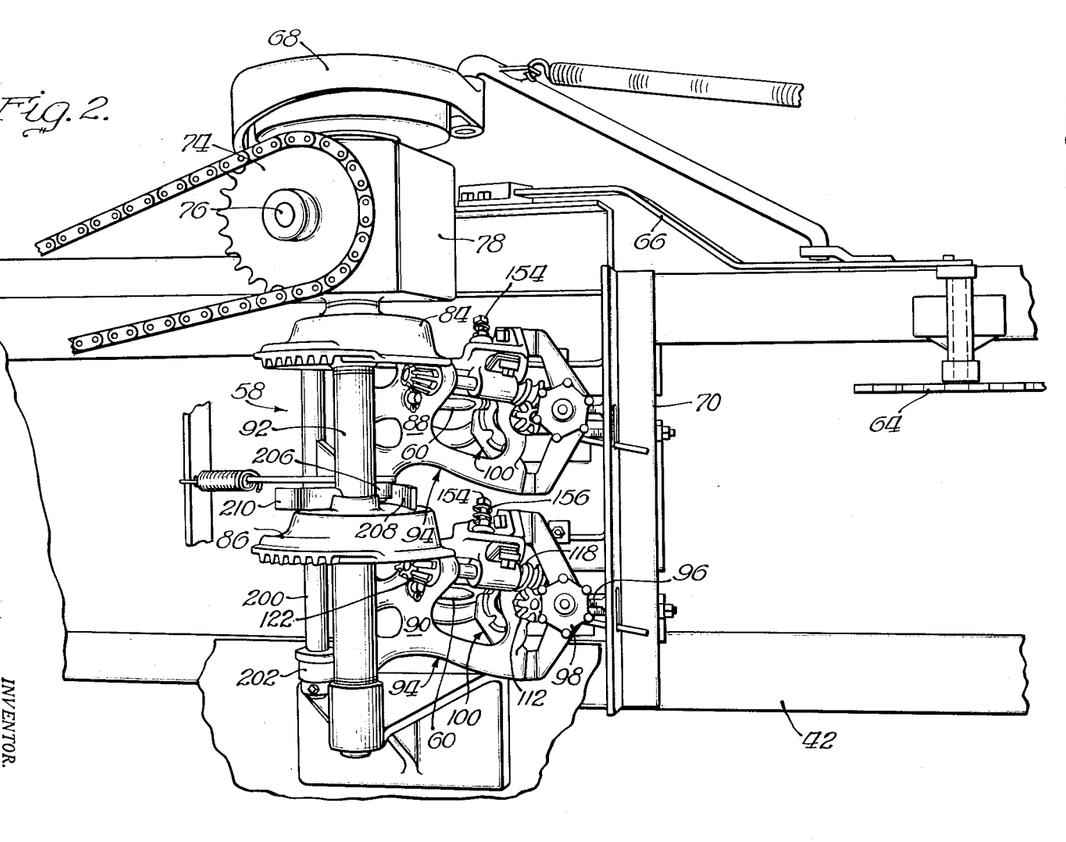
Fig. 2 is an enlarged, perspective side view of the twine tying portion of the baler.

Looking particularly at Fig. 2, it is seen that the knotter frame 90 includes a laterally projecting portion 94 which terminates at its free end adjacent the baling chamber 42 and is releasably fixed to the tying mechanism frame 70 by a bolt 96 and a hand nut 98. Thus the knotter frame can be easily released from its operative position and swung free of the side of the baling chamber to render it more accessible for servicing.

The knotter frame 90 includes generally a twine or strand holder 100, a knotter hook 102 (Figs. 4 and 6) which is normally referred to as a bill-hook, and a movable arm comprising a knife and wiper mechanism 104. The holder 100 comprises a pair of closely spaced apart disks 106 having matching notches 108 formed around their periphery, a shaft 110 which fixedly mounts the disks 106 at one end and is rotatably supported in a suitable opening (not shown) through a section of the frame portion 94, a gear 112 fixed to the other end of shaft 110, and a holder comprising a pair of thin plates 114 and 116 which are disposed between the disks 106 in encircling relation to the shaft 110.

The twine holder gear 112 engages a worm 118 having a shaft portion 120 (Fig. 6) rotatably mounted on the frame 94 and extending toward the main shaft 72. A bevel drive gear 122 is fixed to the end of the shaft 120 in position for engagement with a toothed segment 124 (Fig. 7) of the cam wheel 86. The twine holder plate 114 (Figs. 4 and 5) rests on an adjoining section of the frame 94 and is held in place by engagement of a small peripheral tip 126 with a notch 128 in the frame. The remaining holder plate 116 is pivotally secured at its outer end to the frame 94, as by pin 130 (Fig. 6) and is biased into a position engaging the disk shaft 110 by one or more flat springs 132. The springs 132 are selectively tensioned by adjustment of a supporting bolt 134 at the end of the springs which is most remote from the twine holder.

The knotter or bill-hook, indicated generally at 102 (Fig. 6), comprises a shaft 136, which is journalled at opposite end portions thereof in a yoke-like portion 138 of the frame 94, an operating pinion 140 and a geneva stop 142 which are fixed to the shaft 136, and an inverted curved bill-hook 144 fixed to the end of the shaft adjacent the twine holder 100. The hook 144 carries a movable jaw element 146 which is pivotally mounted intermediate its ends, as by the pin 145, and includes at one end a roller 148 disposed for engagement with a cam segment 150 formed on the frame 94 and with a cam surface 151 of a lever 152 which is carried by the frame 94. The cam lever 52 is adjustably biased into a position in the path of the roller 148 by a bolt 154 and a coil spring 156. The cam surface 151 on the lever 152 extends partially over the cam segment 150 to hold the roller 148 in engagement therewith and thus fix the jaw 146 in open position.

Figures 6, 7:
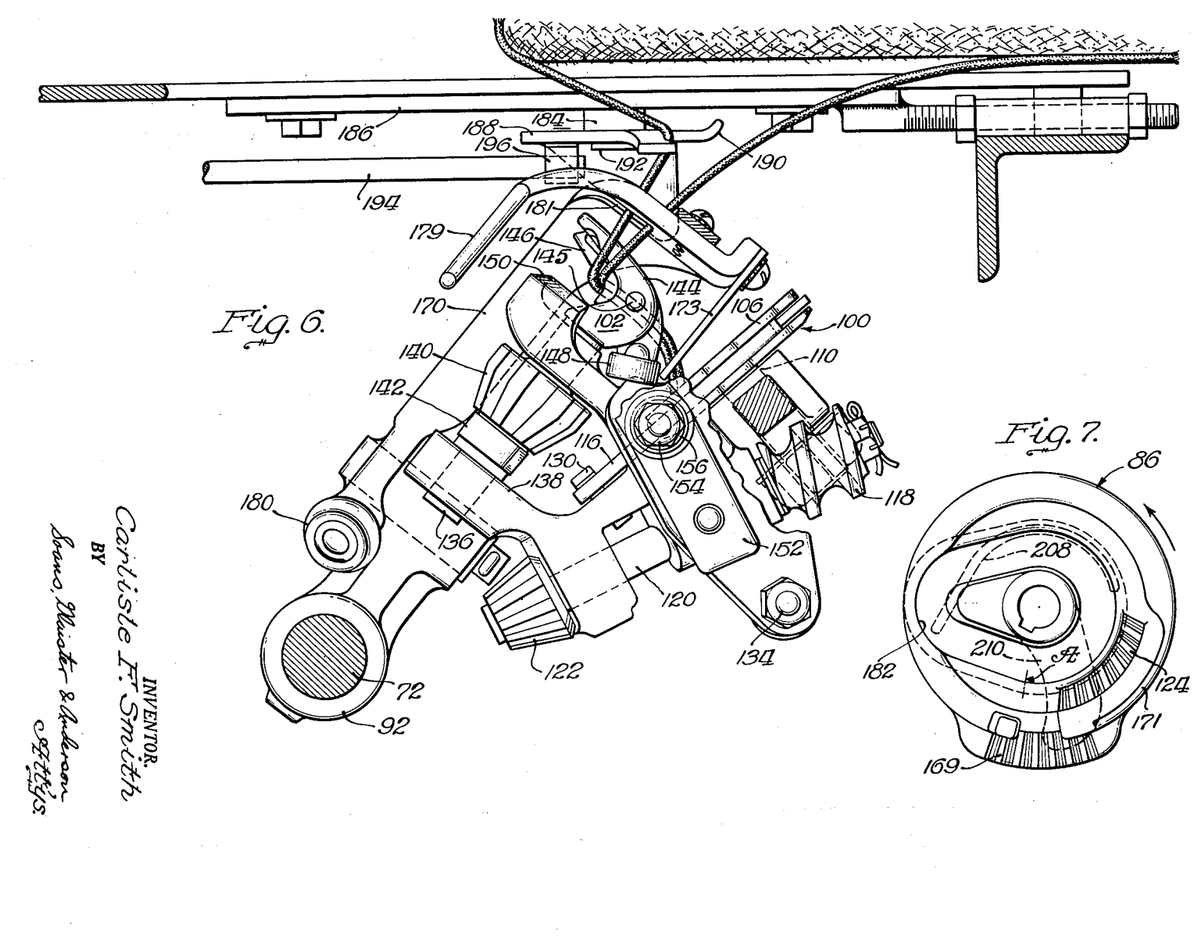
Fig. 6 is a view of the tying mechanism, taken along the line 6—6 in Fig. 5, with the adjacent portion of the baling chamber added to better illustrate the knot-tying operation.
Fig. 7 is a bottom view of one of the cam wheels for the tying mechanism, taken along line 7—7 in Fig. 3.

Also, cam surface 151 extends along the path of the roller 148 at one end of the cam segment 150 to bear against the roller and thereby hold the jaw 146 closed during a portion of its movement about the axis of the rotatable bill-hook shaft 136.

Figures 8, 9, 10, 11, 12:
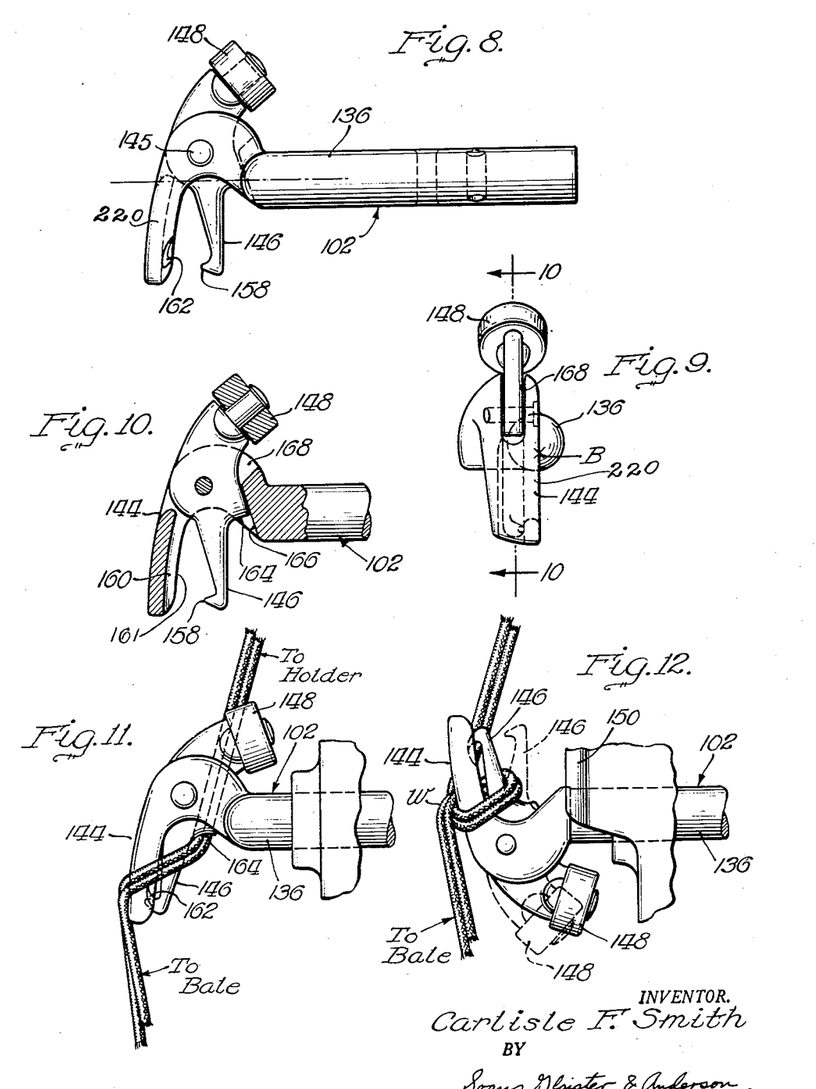
Fig. 8 is an enlarged side view of the improved bill-hook used in the illustrated tying mechanism.
Fig. 9 is an end view of the bill-hook.
Fig. 10 is a sectional view taken along the line 10—10 in Fig. 9, with a part of the shaft broken away.
Figs. 11-15, inclusive, are side views of the bill-hook, illustrating the tying operation performed thereby.
Figure 14:
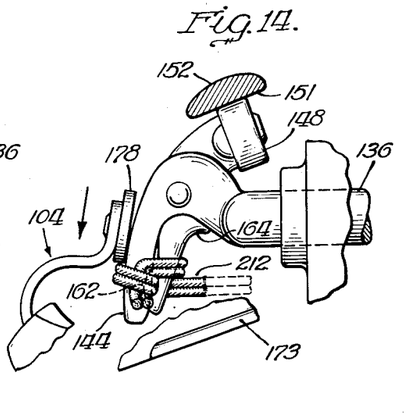

Looking particularly at Figs. 8–10, it may be seen that the bill-hook 102 includes certain novel features of construction affording advantages which will be particularly pointed out in the description of the operation of the tying mechanism. The hook portion 144 and the movable jaw 146 which coacts therewith are disposed on the outer end of the shaft 136 in offset relation to the axis of rotation of the shaft, thereby providing movement of the hook and jaw, upon rotation of the shaft 136, in a circular path. It will also be noted that the movable jaw 146 includes a tip portion 158 disposed for engagement with a center groove 160 formed on the adjacent under side 161 of the hook 144. The tip portion 158 on the jaw and a notch or crochet hook 162 formed along one side 220 of the hook 144 combine to maintain the twine in position between the jaw and the hook when the former has been moved to its closed position (Fig. 14). Furthermore, the intermediate portion of the jaw 146 includes a shoulder 164 (Fig. 10), which is disposed in close relation to a similarly inclined edge 166 at the end of the shaft 136. This particular feature of construction prevents the entrapment of a section of twine in the jaw-receiving longitudinally extending slot or opening 168 through a central portion of the hook, which would interfere with proper operation of the bill-hook in tying a knot or prevent the release of the knot from the bill-hook.

Rotation of the bill-hook 102 is effected by engagement of the pinion 140 (Fig. 6) with the toothed segment 169 at the outer edge of the cam wheel 86 (Fig. 7). When the pinion 140 is out of engagement with the segment 169, the geneva 142 rides along the rim portion 171 of the cam wheel to prevent rotation of the bill-hook.

The knotter frame 90 also includes the combination knife and wiper mechanism 104, which serves to cut the twine from the twine holder 100 and to remove the knot from the bill-hook 102 once the strand around the bale has been tied. As seen in Figs. 4–6, 18 and 19, the wiper mechanism 104 comprises a generally U-shaped lever 170 having one of its legs pivotally supported on the frame 94, as by a pin 172. The free leg of the lever 170 is disposed for movement in close relation to the bill-hook 102 and twine holder 100 and includes a cutting element or knife blade 173 and a knot stripping element or wiper 174 which are detachably secured to the lever 170. The wiper 174 comprises a curved strap 176 which extends away from the lever 170 in overlying relation to the outer most surface of the bill-hook 102 and carries at its free end a metal disk 178 for engagement with the upper surface of the bill-hook. The free end of the lever 170, which carries the knife 173 and the wiper 174, also includes a laterally projecting portion terminating in a curved stem 179 for engaging the twine extending between the tying mechanism and baling chamber to provide suitable means for guiding the twine into the knot tying mechanism.

Figure 5:
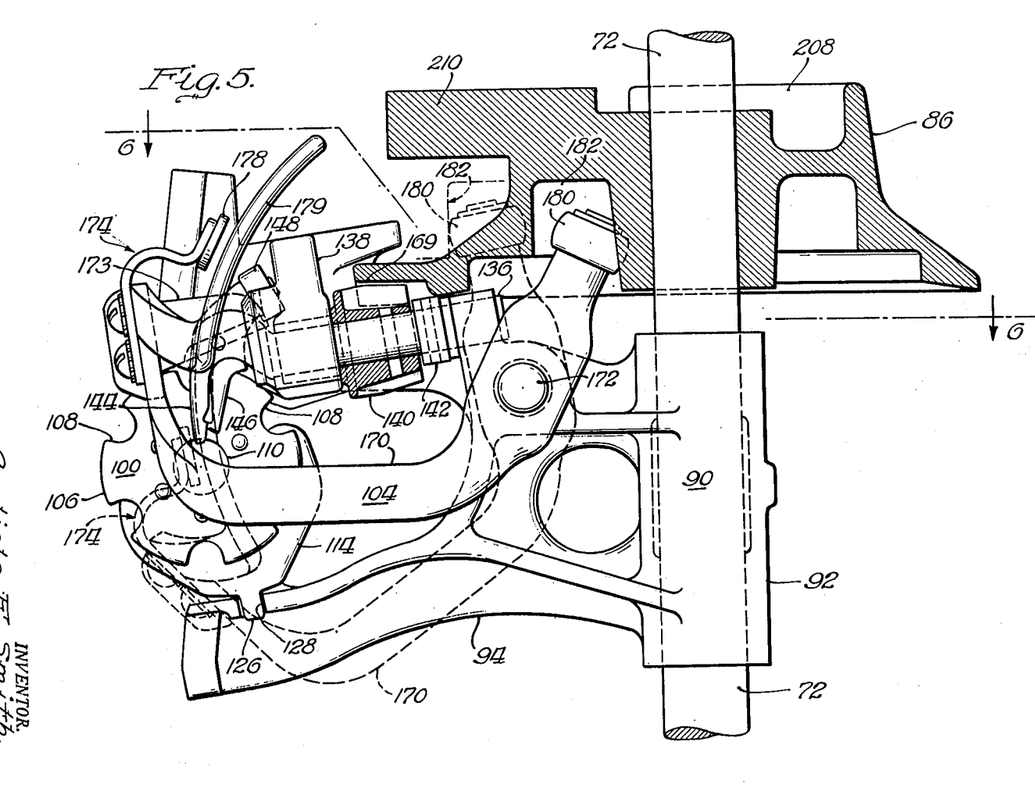
Fig. 5 is an enlarged side view, partly in section, of a portion of the tying mechanism, the broken lines indicating the lowermost position of the knot-wiping element.

The other end of the lever 170, adjacent the pivot pin 172, terminates in a reduced cylindrical portion mounting a roller 180 which engages a track 182 on the under side of the cam wheel 86 (Figs. 5 and 7). The irregular track 182 controls the operation of the lever 170 in moving the knife 173 and wiper 174, at a predetermined time in the tying operation, to cut the strands of twine between the twine holder 100 and the bill-hook 102 and to wipe the completed knot from the bill-hook.

Figure 3:
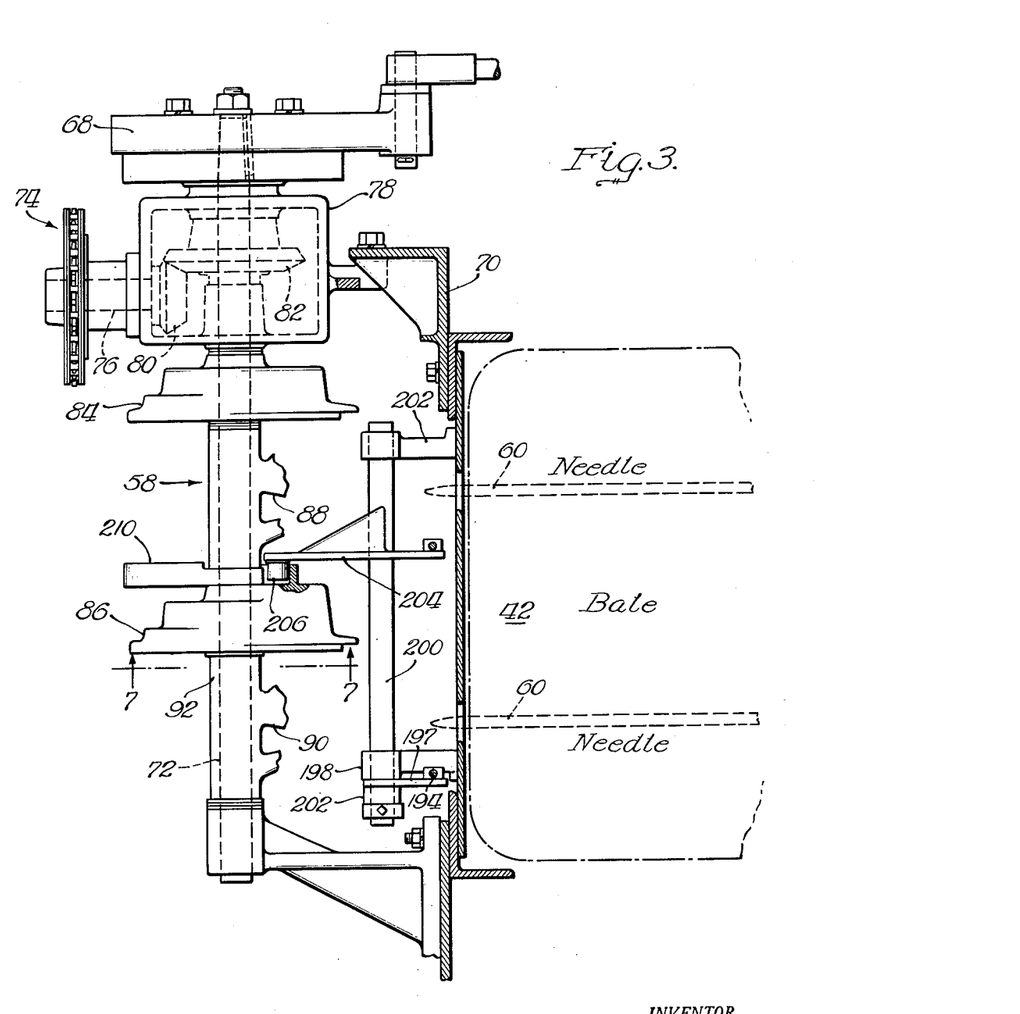
Fig. 3 is an enlarged, diagrammatic side view of the tying mechanism, with parts broken away.
Figure 4:
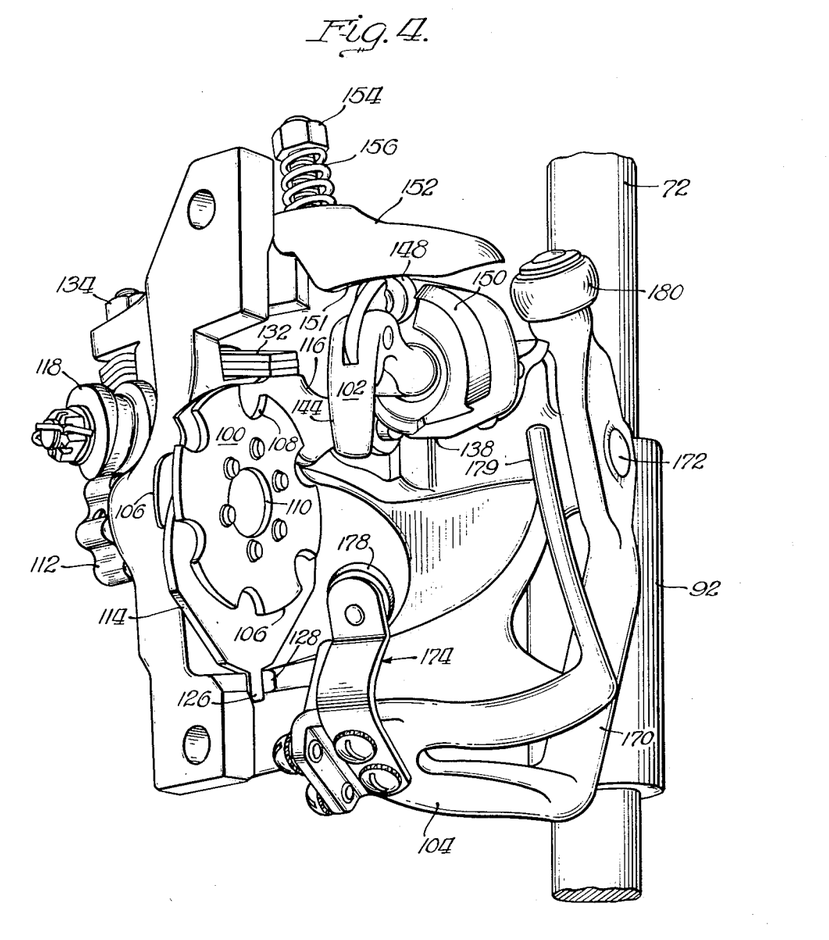
Fig. 4 is an enlarged, perspective view of a portion of the tying mechanism seen in Fig. 2, with the knot-wiping element moved away from its operative position to more clearly depict other features of the mechanism.

Also disposed on the case of the baling chamber 42 for assisting in the tying operation are a pair of oscillating tucker finger assemblies 184, one for each of the knotters. As seen in Figs. 3 and 6, each tucker finger assembly comprises generally a supporting plate 186 mounted on the side of the baling chamber, a tucker finger 188 pivotally mounted on the supporting plate by means of a pin 192 and including a vertically extending flange 190, and an operating rod 194 extending forwardly from a pivotal connection 196 with the tucker-finger. The opposite end of the connecting rod 194 is pivotally connected to a lever 197 (Fig. 3) extending outwardly from a sleeve 198 fixed to a vertical shaft 200 for rotation therewith. The ends of the vertical shaft 200 are supported in journal bearing members 202 fixed to the baling chamber, and controlled rotation of the shaft is effected through an arm 204 and roller 206 which provide a driving connection with the cam wheel 86. The roller 206 rides in a curved groove 208 and around a cam lever 210 on the upper surface of the cam wheels 86 to thereby provide oscillation of the shaft 200 through a predetermined arc. The movement of the shaft 200 in turn results in pivotal movement of the tucker finger 184 about the pin 192 to release the strand of twine retained by the front edge of flange 190 and move it to the opposite edge of the flange 190 along the rearward end of the tucker finger. This operation is controlled by the cam wheel 86 for occurrence at a predetermined stage of the knot tying operation to thereby provide additional slack in the twine for forming the knot. A more detailed disclosure of the tucker-finger assembly will be found in the co-pending application Serial No. 375,126, Carlisle F. Smith and Robert B. Skromme, filed August 19, 1953, and assigned to the assignee of the present invention.

In operation, the material to be baled is conveyed, by the pick-up unit 26 and the auger feed 28, to the baling chamber 42 where the plunger 44 compresses the material into bale form. Ahead of the material to be compressed, the needle 60 moves through the baling chamber to place a strand of twine in a pair of notches 108 (Fig. 6) of the twine holder and the disks 106 are rotated, by movement of the toothed segment 124 relative to the gear 122, to clamp the single strand in position on the holder between the plate 116 and the disks. The needle 60 withdraws through the bale chamber, leaving the strand disposed in the twine guide notch 181 on the tying mechanism (Fig. 6), and the loose twine moves rearwardly with the bale as it is being formed.

When sufficient material has accumulated in the baling chamber 42 to form a complete bale, the toothed wheel 64 will have been rotated sufficiently to move lever 66 so as to engage the clutch 68 and thereby actuate the needle operating mechanism to move the needle 60 across the forward end of the bale and place another section of the length of twine in the holder 100. The engagement of the clutch also starts the rotation of the shaft 72 to begin the operation of the tying mechanism.

Figure 20:
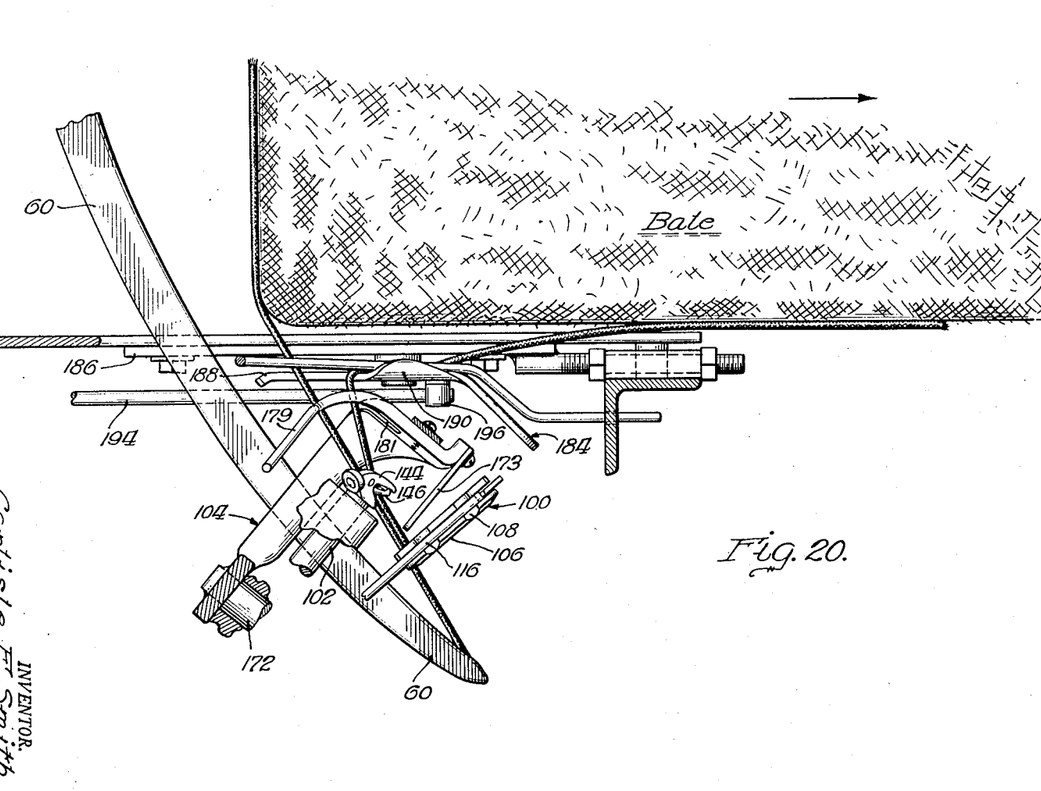
Fig. 20 is a view similar to Fig. 6, illustrating the relative position of certain of the elements at another stage of the knot tying operation.

When the shaft 72 starts to rotate, the cam wheels 84 and 86 (Fig. 2) rotate with it. As indicated above, the segment 124 (Fig. 7) engages the gear 122 to effect movement of the disks 106, thereby clamping the ends of the twine between the disks and the holder plate 116. The twine is now positioned as seen in Fig. 20, with both ends fixed in the twine holder 100 and extending across the lower jaw 146 of the bill-hook and across the forward edge of the tucker-finger 188 to the loop encircling the bale. During the positioning of the end of the twine in the holder 100, the bill-hook is held against rotation by engagement of the geneva stop 142 with the rim section 171 on the cam 86, and the roller 148 is engaged by the cam surface 151 of the lever 152 to hold the jaw 146 closed.

Continued rotation of the cam wheel 86 places the bill-hook drive gear 140 in meshing engagement with the segment 169 to cause the bill-hook to rotate counterclockwise toward the baling chamber 42, placing the section of twine nearest the baling chamber on the upper surface of the hook 144 (Figs. 6 and 11). The offset position of the hook 144, which is moving toward the twine holder 100 at this stage, provides means whereby the increase in demand for twine to make a knot, due to the described twisting action, is supplied by the long strand around the bale rather than by the very short section extending to the twine holder 100.

Looking also at Figs. 3, 6 and 7, it will also be noted that, as the knot tying operation commences, the roller 206 controlling the operation of the oscillating tucker-finger 184 engages the cam lever 210 on the upper surface of the cam wheel 86. Consequently, the tucker-finger is pivoted clockwise about the pivot pin 192, until it has reached the position shown in Fig. 6. This action of the tucker-finger moves both ends of the strand rearwardly into the seat of the notch 181, with the rearward strand being thereby moved over the flange 190. Thus the ends of the strand are moved into firm engagement with the jaw 146 of the bill-hook 102, extending therefrom in a direction such that the strands will not slip off the bill-hook when it is rotated. As seen in Fig. 7, the described action of the tucker finger assembly 184 occurs as the bill-hook 102 starts to rotate to wrap the twine therearound. Furthermore, the movement of the tucker finger is quite rapid and it returns quickly to the position shown in Fig. 6, just after the bill-hook 102 has begun rotating, to thereby provide additional slack in the twine for tying the knot.

Figure 13:
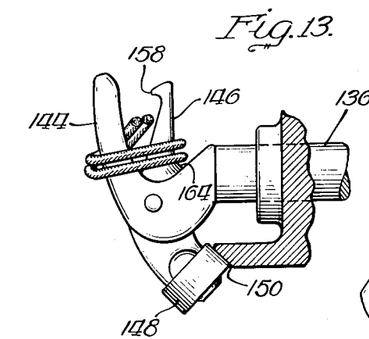

The bill-hook continues to rotate, as gear 140 moves along the segment 169, to form a loop around the bill-hook, as seen in Fig. 12. As the loop is completed, the roller 148 engages the cam surface 150 and thereby opens the lower jaw 146 (Fig. 13) for a sufficient length of travel to receive the tail ends of the twine which extend between the bill-hook and the twine holder 100. As the roller 148 moves off the cam 150, the jaw 146 is closed due to the spring pressure exerted by the roller engaging cam surface 151 on the lever 152 (Fig. 14), thereby firmly clamping the ends of the twine in the bill-hook. Also, the roller 180 on the end of the twine-knife mechanims 104 strikes a point A (Fig. 7) in the path of its operating cam surface 182 which initiates the movement of the knife mechanism 104 from its uppermost position shown in full lines in Fig. 5 toward the lowermost position indicated in broken lines. The bill-hook drive gear 140 has now moved out of engagement with segment 169 and the geneva 142 is again sliding along the rim 171 to hold the bill-hook against rotation.

As the grasping of the loop of twine is completed, it will be noted (Fig. 14) that the tail ends of the twine are held securely in position by the crochet hook or notch 162 on the side of the hook element 144 and by the cooperating jaw tip 158 nesting in the groove 160 (Fig. 10). The downward motion of the knife mechanism 104 carries with it the metal disk wiper 178 and the knife blade 173. As the wiper 178 approaches the loop of twine on the outer surface of the hook 144, the knife 173 passes between the bill-hook, and the twine holder 100 to sever the double strand of twine held by the latter, thus presenting the free tails of twine 212.

Figure 15:
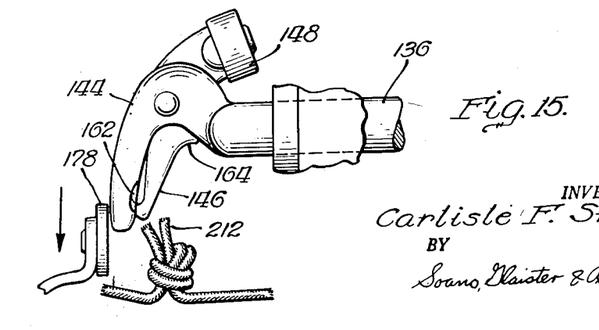

The disk wiper 178 moves into engagement with the twine on hook 144 and carries the bight portion held on the outer surface of the hook off the end of the hook (Fig. 15). And, since the tails 212 are firmly held by the bill-hook, the tails follow the bight from the hook, passing out of the side opening 162 formed between the jaw 146 and the hook 144, to thereby form the double overhand knot shown in the figure.

The efficiency of the knot tying operation just described is considerably enhanced by the novel features of the construction of the bill-hook 102 and its associated mechanism. As noted in Figs. 6, 11 and 13, at the initial stage of the knot tying motion of the bill-hook, as well as during the period when the jaw 146 is open, there is considerable pressure by the twine on the outer surface of the jaw 146 in the direction of the bill-hook shaft 136. Consequently, there is a tendency during such periods for the twine to move toward the crevice between the center portion of the jaw 146 and the adjacent edge 166 of (Fig. 10) of the recess 168 in the bill-hook. The shoulder 164 on the jaw 146 limits the movement of the twine in this direction and thus prevents the twine from being pinched during the opening movement of the jaw.

Furthermore, the addition of the crochet hook 162 to the side of the bill-hook affords definite advantages in maintaining the twine in position on the bill-hook during the tying operation. As the bill-hook starts wrapping the twine around it (Fig. 11) the crochet hook 162 provides a groove on the twine engaging side of the bill-hook to prevent the twine from possibly slipping off the hook. Moreover, as the knot is nearing completion (Fig. 14) the crochet hook 162 provides, with the tip 158, a positive means for holding the twine tails 212 in position between the jaw 146 and the hook 144 until the disk wiper 178 has moved along the hook to strip the bight portion of the twine, from the hook, thereby forming a knot when the tails 212 are pulled out of the side opening provided by the crochet hook and the adjacent portion of the jaw 146.

Then too, the provision of the means 104 for positively removing the twine from the bill-hook 102 affords real advantages. Heretofore, tying mechanism of this type depended upon the tension of the twine to effect the final knot tying and removal from the bill-hook and this method was unreliable. In many instances there would either be no knot formed or the twine would be broken, because of the failure of the bill-hook to release the twine properly. With the disk wiper 178 timed with the movement of the bill-hook 102 and the knife blade 173, the bight portion of the twine around the bill-hook is positively moved off the hook at the proper time to form a knot and thus prevents breaking the twine through excessive tension thereon. It is also important to note (Figs. 5 and 15) that the path of movement of the wiper 178 is confined to a position overlying the bill-hook so that, once the knot is formed, there is no room between the wiper and the hook 144 for the twine to move back on to the bill-hook and thus become fouled in the tying mechanism.

Figure 16:
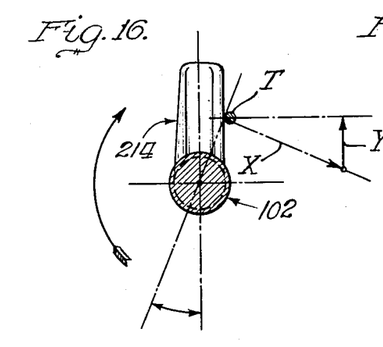
Figs. 16 and 17 are schematic illustrations, comparing the forces exerted by the twine on a conventional bill-hook (Fig. 16) with those on the improved bill-hook (Fig. 17).

Perhaps one of the most advantageous features of construction herein is the offset relation of the hook 144 with respect to its supporting shaft 136. This offset relationship affords movement of the bill-hook toward the twine holder 100 during the tying operation, to thereby provide for taking slack from the bale side of the twine rather than from the very short section of twine between the bill-hook and the twine holder 100. Consequently, the tension is on the long strand of twine around the bale and is readily absorbed. In the straight type of bill-hook (Fig. 16), the tension is in both directions along the twine and there is considerable tendency to snap the twine adjacent the twine holder.

It is also found that with the offset bill-hook the twist W (Fig. 12) in the tying strand, which occurs during the formation of the bight on the bill-hook, is essentially coaxial with the axis of rotation of the shaft 136 and, therefore, is subjected to a minimum of tension during the rotation of the bill-hook. This is due to the fact that the side surface 220 of the bill-hook upon which the twist T is formed (at point B in Fig. 9) is generally coplanar with the axis of rotation of the shaft 136, due to the offset relation of the bill-hook. Consequently, there is a minimum of tension on the strand held by the twine holder 100, and the rotation of the bill-hook does not increase this tension so as to snap the strand or cause it to be pulled loose from the twine holder. In the previous type of bill-hook, wherein the twist in the strand is formed in offset relation to the axis of rotation, the knotter depended upon the slippage of twine through the disk holder to prevent breaking the strand. This is very unreliable, however, since such slippage depends on many variables such as the physical characteristics of the twine, the amount of moisture in the air which might be absorbed by the twine, the adjustment of the twine holder etc. Consequently, the use of a straight bill-hook often resulted in either breaking the twine because the twine holder did not provide any slippage, or in the twine holder entirely releasing the twine prematurely so that a knot could not be completed.

Figure 17:
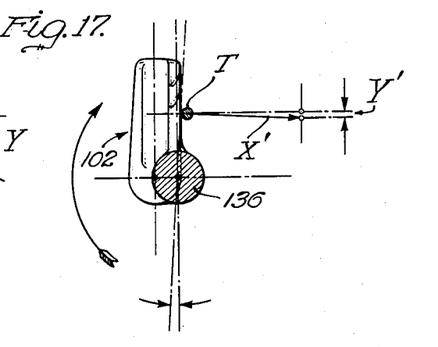
Figures 18, 19:
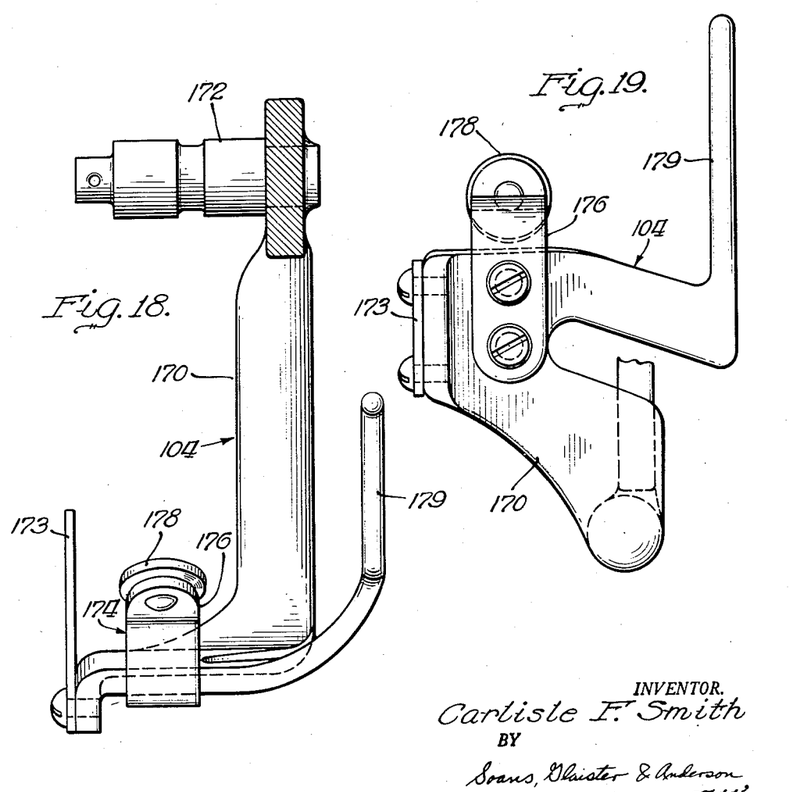
Fig. 18 is an enlarged view of the knot-wiping element seen particularly in Figs. 4 and 5, with parts broken away.
Fig. 19 is a bottom plan view of the structure in Fig. 18, with parts broken away.

Furthermore, with the offset bill hook, the tendency of the twine to pull off the bill-hook prematurely is eliminated or considerably reduced. Looking at Fig. 16, it is seen that a straight bill-hook 214 engages the twine T at an angle such that the force therebetween is resolved into the components X and Y, with the latter providing an appreciable percentage of the total force and being directed so as to move the twine T off the end of the bill-hook. Consequently, in an arrangement of this type the twine is frequently forced from the bill-hook before a knot can be formed. However, with the offset bill-hook 102 (Fig. 17) the application of force at the side of the bill-hook is essentially in the plane of the axis of the shaft 136 and, as a result, the component Y' tending to remove the twine T from the bill-hook is negligible. For purposes of illustration the component Y' is given a plus value, but it will be readily understood that the face of the offset bill-hook 102 may be exactly in the plane of the axis of shaft 136 and thus entirely eliminate the component Y'.

It is seen, therefore, that the present invention discloses novel features of construction in knot tying mechanism which afford real advantages. And, although illustrated and described with respect to a particular embodiment it will be readily apparent that the principles of the invention may well be followed in other forms of apparatus.

I claim:

1. In a baler including means for the encircling of a bale with a tying strand, a bale tying mechanism comprising a strand holder, and a knotter disposed between said strand holder and the strand-encircled bale, said knotter comprising a frame, a supporting shaft mounted on said frame for relative rotation, and an inverted curved bill-hook fixed at one end of said supporting shaft for rotation therewith, said bill-hook being disposed in laterally offset relation with respect to the axis of said shaft so that the longitudinal axis of said shaft lies generally in the plane of one side surface of said bill-hook, whereby rotation of the bill-hook to form a bight in a section of the tying strand engaged by said bill-hook and held by said strand holder will present a twist in the strand which is essentially along the longitudinal axis of said supporting shaft, thereby minimizing the tendency to pull the strand from the strand holder during rotation of the bill-hook.

2. A bill-hook for use in connection with bale tying mechanism comprising, a rotatable supporting shaft, an inverted curved hook at one end of the shaft arranged with its longitudinal axis disposed in laterally offset relation to the longitudinal axis of said shaft and said hook including a centrally disposed longitudinal slot, and a movable jaw element disposed through said slot and fixed to said hook for pivotal movement relative thereto, said movable jaw element having a shoulder portion formed thereon adjacent the pivotal connection with said hook, said shoulder portion extending in the direction of said supporting shaft in close relation to the shaft side of said slot so as to prevent a tying strand engaged by said movable jaw from entering said elongated slot.

3. A bill-hook for use in connection with bale tying mechanism comprising, a supporting shaft, an inverted curved hook at one end of the shaft including a centrally disposed longitudinal slot, and a movable jaw element fixedly positioned in said slot for pivotal movement relative to said hook, said jaw including an angularly disposed tip portion at its free end extending toward said hook, said hook including an elongated groove along its jaw-facing surface in position for receiving said tip-portion of said jaw, said hook also including a notch along one side surface thereof which terminates at a position opposite said jaw tip-portion in an inwardly curving hook-shaped surface, said tip-portion on said jaw and said elongated groove on said bill being adapted to grasp a section of a tying strand therebetween, said notch in said hook being adapted to guide the grasped strand in its passage from the bill-hook, and said movable jaw also including a shoulder portion formed thereon adjacent the pivotal connection between said jaw and said hook and extending in the direction of said supporting shaft in closely approaching relation thereto to prevent a section of the tying strand engaged by said bill-hook from entering said elongated slot interfering with the pivotal movement of said jaw element.

4. In a baler including means for the encircling of a bale with a tying strand, a bale tying mechanism supported on the baler and comprising a strand holder for engaging the overlapping ends of the tying strand, and a knotter including a frame structure disposed between said strand holder and the strand encircled bale, said knotter including a bill-hook mounted at the end of a rotatable supporting shaft carried by said frame structure, said bill-hook being arranged with its longitudinal axis disposed in laterally offset relation to the axis of rotation of said supporting shaft, whereby said bill-hook is engageable with the tying strand at a position between the encircled bale and said strand holder and is movable relative thereto to form a bight in the strand ends held by said strand holder, the offset disposition of said bill-hook being effective to cause the latter to move toward said strand holder as it forms said bight, to thereby produce tension primarily on the portion of the tying strand encircling the bale during the formation of said bight.

5. In a baler having means for encircling a bale with a tying strand, an improved bale tying mechanism comprising a strand holder for engaging and holding the overlapping ends of the tying strand, a knotter comprising a frame structure supporting a bill-hook for forming a bight in the strand ends held by said holder, said bill-hook being mounted on the end of a shaft carried by said frame structure for rotation about the longitudinal axis of said shaft, said bill-hook being eccentrically mounted with respect to said shaft axis, and means carried by said frame structure for movement through a path adjacent said bill-hook for severing the ends of the tying strand held by said strand holder and for stripping the bight from the bill-hook to thereby pull the severed ends of the strand through the bight to form a knot.

6. In a baler having a needle movable through a path transversely of the baling chamber to encircle the bale therein with a tying strand, an improved bale tying mechanism comprising a strand holder supported adjacent said baling chamber in position for receiving and holding the ends of the tying strand presented thereto by the needle, a knotter disposed between said strand holder and the baling chamber, said knotter comprising a frame structure rotatably mounting a shaft having a bill-hook disposed at the outer end thereof in laterally offset relation to the axis of said shaft for rotation therewith, said bill-hook being positioned for engagement with the ends of the tying strand, cutting means carried by said frame structure and movable through a path between said strand holder and said bill-hook, stripping means carried by said frame structure and movable through a path closely adjacent to the outer surface of said bill-hook, and said bale-tying mechanism including means for moving said bill-hook, cutting means and stripping means to effect a sequential operation thereof in timed relation to one another, whereby said bill-hook rotates about the axis of its supporting shaft to form a bight in the tying strand and, when the bight is thus formed, said cutting means severs the strand intermediate said strand holder and said bill-hook, and said stripping means strips the bight off the free end of the bill-hook to thereby pull the severed ends of the strand through the bill-hook to form a knot.

7. A bill-hook for use in connection with bale tying mechanism comprising, a rotatable supporting shaft, an inverted curved hook fixed at one end of said shaft in laterally offset relation to the axis of rotation of said shaft to thereby present a side surface of said hook which is generally coplanar with the axis of said shaft, said hook including a centrally disposed slot therethrough adjacent the shaft end thereof, and a jaw element disposed through said slot and pivotally mounted on said hook, whereby rotation of said bill-hook to form a bight of tying strand thereon effects a twist in the strand which is along said side surface of said hook and substantially coaxial with the axis of said shaft.

References Cited in the file of this patent

UNITED STATES PATENTS

| 378,815 | Whiteley | Feb. 28, 1888 |
| 399,108 | Withington | Mar. 5, 1889 |
| 642,870 | McKinney | Feb. 6, 1900 |
| 2,403,396 | Raney | July 2, 1946 |
| 2,651,252 | Pope | Sept. 8, 1953 |

FOREIGN PATENTS

| 966,268 | France | Mar. 1, 1950 |